Sept. 9, 1958
H. FEICHTINGER ET AL
PRODUCTION OF AMINOALKYL SULFONIC
ACIDS AND AMINOALKANOLS
Filed Oct. 16, 1956
2,851,484
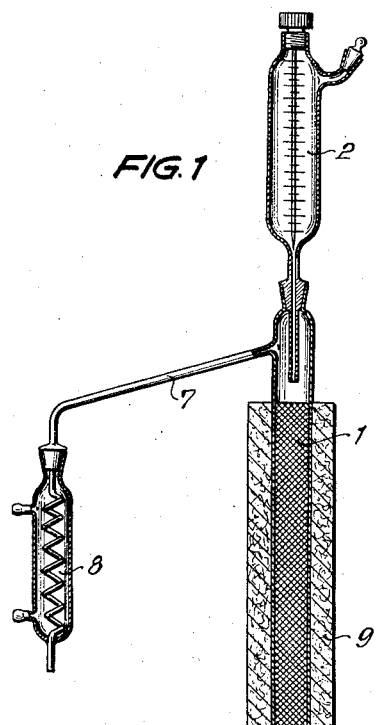
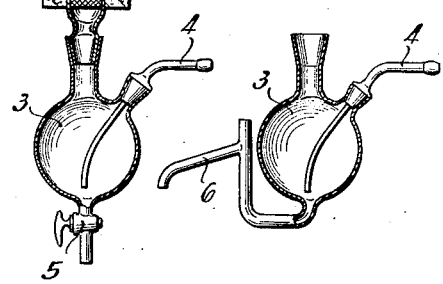
INVENTORS
HANS FEICHTINGER
SIEGFRIED PUSCHHOF
BY Burgess and Dinklage
ATTORNEYS

United States Patent Office 2,851,484
Patented Sept. 9, 1958

2,851,484

PRODUCTION OF AMINOALKYL SULFONIC ACIDS AND AMINOALKANOLS

Hans Feichtinger and Siegfried Puschhof, Duisburg-Beeck, and Hans Tummes, Duisburg-Meiderich, Germany, assignors to Ruhrchemie Aktiengesellschaft, Oberhausen-Holten, Germany, a German corporation Application October 16, 1956, Serial No. 616,323

Claims priority, application Germany April 4, 1952

14 Claims. (Cl. 260—513)

This invention relates to and has as its object a process for the conversion of compounds of the general formula $NRR'C_nH_{2n}X$, wherein R and R' are alkyl radicals having from 1 to 3 carbon atoms, X is a substituent selected from the group consisting of Cl and $SO_2Cl$ and $n$ is a whole number from 3 to 18. The invention is a continuation-in-part of our copending applications Serial No. 344,479, filed March 3, 1953, and Serial No. 409,507, filed February 10, 1954, and Serial No. 411,228, filed February 18, 1954, all now abandoned.

It has now been found in accordance with the invention that hydrochlorides of compounds of the general formula $NRR'C_nH_{2n}X$, wherein R, R', $n$ and X have the meaning stated above give a good yield of amino alcohols or aminosulfonic acids if they are heated in the presence of liquid or evaporated water to temperatures ranging between 100° and 300° C., temperatures of 160–230° C. being particularly advantageous.

Amine alkyl chlorides and amine alkyl sulfochlorides are known a long time. It is also known that these compounds tend to ring formation and polymerization at elevated temperature. For this reason, uniform end products could not be obtained up to the present from compounds of the general formula $NRR'C_nH_{2n}X$ at elevated temperatures by the action of water or water vapor. Only when previously converting the above-mentioned amine compounds, by the process of the invention, into their hydrochlorides, $HCl.NRR'C_nX$ then amino alcohols or amino sulfonic acids are formed in a good yield in the temperature range mentioned about 100–300° C. by the action of water or water vapor, with no undesirable polymerization or ring formation. The possibility of satisfactorily effecting these conversions was extremely surprising for those skilled in the art because it had to be expected that the serious inclination to ring formation and polymerization present at elevated temperature would not be lost by the conversion of the amino compounds mentioned above into hydrochlorides.

Amine hydrochlorides of the general formula $HCl.RR'C_nH_{2n}X$ have already been treated with alkaline solutions at normal temperature. However, the hydrochlorides mentioned were extremely stable in this conversion so that neither saponification nor splitting-off of hydrogen chloride could be observed.

The starting material used for the process of the invention are likewise aliphatic alkylamine hydrochlorides which are chlorinated or sulfo-chlorinated in their carbon chain and which may be obtained by known methods of organic chemistry. The alkylamine hydrochlorides substituted in this manner in their carbon chain are heated with water. In this way, it is possible to hydrolyze not only homogeneous chloramine hydrochlorides, but also chlorinated or sulfochlorinated mixtures which form by the introduction of chlorine or the sulfo-chloride group into the carbon chain of amine hydrochlorides. Chlorinated or sulfochlorinated amine hydrochlorides of this kind area easily obtainable by treating amine hydrochlorides in solution or suspension with gaseous chlorine or mixtures of chlorine and sulfur dioxide. For each mol of amine hydrochloride there are suitably introduced 0.2 to about 1.2 mols chlorine or chlorine and sulfur dioxide into the aliphatic carbon chain by substitution. Similar to the distributation of chlorine substituents in straight-chain aliphatic hydrocarbons, there are formed, at high degrees of chlorination such as, for example, when introducing 0.5–0.6 gram atoms of chlorine per mol amine hydrochloride, di- and polychlorides of all possible positions which form undesirable by-products.

Chlorination or sulfochlorination products of primary aliphatic amine hydrochlorides having 3–8 carbon atoms are preferably suitable for the conversion according to the invention. It is possible to process not only chlorination or sulfochlorination mixtures in which the chlorine or sulfochlorine group substituent is statistically distributed within the carbon chain, but also homogeneous compounds of the hydrochlorides such as, for example, 5-chlor-1-amine-pentane, 4-chlor-1-amino-butane, 3-chlor-1-amino-butane, 5-chlor-2-amino-octane, or the corresponding sulfochloride compounds. The compounds just mentioned are only examples for the applicability of the process. This does not exclude the processing of other compounds of similar constitution.

The saponification of the chloramino-alkane-hydrochlorides and the as such known recovery of the free amino alcohols proceeds according to the following reaction:

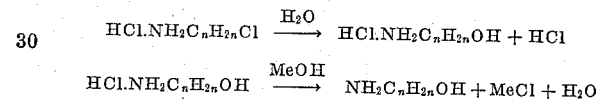

$$HCl.NH_2C_nH_{2n}Cl \xrightarrow{H_2O} HCl.NH_2C_nH_{2n}OH + HCl$$

$$HCl.NH_2C_nH_{2n}OH \xrightarrow{MeOH} NH_2C_nH_{2n}OH + MeCl + H_2O$$

The hydrolysis, in accordance with the invention, is effected by simply heating the hydrochlorides with an amount of water equal to one to ten times, and preferably five or ten times the quantity of hydrochloride. The reaction temperature may range between 100° and 300° C. Reaction times of 1–20 hours are required. During the saponification, the initially neutral reaction product becomes acid due to the escaping hydrochloric acid.

To carry out the hydrolysis, the reaction mixture may either be boiled under reflux or heated in closed containers under correspondingly increased pressure. The pressure vessels must be constructed of or lined with materials which are resistant to hydrochloric acid. The pressures resulting during the saponification correspond to the respective vapor pressure of the aqueous solution of hydrochloric acid present. At 200° C., a pressure of 10–15 kg./sq. cm. results. During the conversion, the degree of saponification may be observed by continuously analyzing samples for chlorine ions.

To recover the free amino alcohols, the saponification products are mixed with strong bases such as caustic soda, potash lye or lime water in the conventional manner, and are then subjected to a distillation which, if necessary or desired, may be a vacuum distillation. In large-scale operation of the process according to the invention, it is advantageous to distil off the hydrochloric acid as far as possible from the products of the hydrolysis and then to process the residue into amino alcohols with strong bases. The basic materials may be used in the solid state or as highly concentrated solutions in a quantity which corresponds to the titratable quantity of free and combined hydrochloric acid.

During the hydrolysis of the chlorinated amino hydrochlorides, a formation of olefins may occur as side reaction, as is also the case in the hydrolysis of alkyl chlorides. In this way small amounts of alkenyl amine hydrochlorides are formed in both the processing of chloramine hydrochloride mixtures and in the processing of homogeneous chloramine hydrochlorides. In addition to amino olefins, amines which contain two hydroxy groups or an oxo group in their chain are formed as further by-products in the production of amino alcohols in accordance with the invention. These by-products correspond to the statistical distribution of the chlorine atoms, which are introduced into the carbon chain. These by-products are obviously caused by the presence of dichlorides in the chlorination mixture, which have chlorine atoms on adjacent, the same, or separated carbon atoms.

Amino alcohols obtained in accordance with the invention may with particularly good success be used for the production of alkyl resins and other polymerization products. In addition, they may be used as starting products for numerous other organic syntheses.

If hydrochlorides of amino-alkyl sulfochlorides are treated by means of the process of the invention, aliphatic amino-sulfonic acids are formed. Here again, the hydrolysis is effected with water or water vapor. In this manner, a short reaction time only is sufficient at elevated temperature to reach complete hydrolysis.

By this hydrolyzing reaction the $SO_2Cl$ group located in the aliphatic carbon chain is converted into an $SO_3H$ group which, in turn, as the stronger acid, displaces the hydrogen chloride from the ionogenic link with the amino group with the formation of an internal salt. The reaction proceeds in accordance with the following equation:

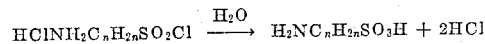

$$HClNH_2C_nH_{2n}SO_2Cl \xrightarrow{H_2O} H_2NC_nH_{2n}SO_3H + 2HCl$$

It is possible in this manner, with evaporation of the reaction solution, to practically quantitatively remove the hydrogen chloride (2 mols) and to obtain the pure amino-sulfonic acid. To accelerate the evaporation of the hydrogen chloride the use of saturated or superheated steam is of advantage. When effecting the hydrolysis in this manner, the hydrochloric acid which forms may immediately be removed from the reaction mixture and condensed separately therefrom.

Since the hydrochlorides of the amino-alkane sulfochlorides, are considerably more easily hydrolyzed than the non-substituted alkyl sulfochlorides, the hydrolysis may be effected at lower temperatures. The quantities of water used for the hydrolysis may vary within wide limits. From 1 to 10 times the quantity of water referred to the starting material is preferably used.

The hydrolysis in accordance with the invention may be effected at temperatures ranging between zero and 250° C. When operating within a closed reaction vessel from which the hydrochloric acid cannot escape, the temperature should not exceed 150° C.

The isolation of the pure amino-sulfonic acid is effected by evaporation to dryness, or by precipitation of the concentrated solution with absolute alcohol. The yield of amino-sulfonic acid obtained amounts to approximately 85–95% of the theoretical yield with reference to the mineral salt of amino-alkane sulfur chloride charged.

The heating, according to the invention, of hydrochlorides chloroalkyl amines or amino-alkyl sulfochlorides is preferably effected in continuous operation. This may be done with the equipment shown in the drawing where:

Figure 1 shows an embodiment of an apparatus for effecting the process in accordance with the invention partially in section, and Figure 2 shows a partial section of a further embodiment of the collecting vessel of the apparatus shown in Fig. 1.

It has now been found that the saponification of chloralkyl-amine hydrochlorides and amino-alkyl-sulfochloride hydrochlorides may be effected in a very simple manner and in continuous operation if the starting hydrochloride is contacted with superheated water vapor at a temperature of 105–250° C. and preferably of 105–170° C., instead of effecting the contacting with the liquid hydrolyzing agents conventionally used.

When, in accordance with the conventional mode of operation, the hydrolysis is effected with water, elevated pressure in a closed system is required for complete conversion. As contrasted to this the use of superheated steam in accordance with the invention, permits not only saponifaction of the product without pressure, but at the same time continuous removal of the resulting salts from the system. In addition, it is possible by appropriate measures to condense the hydrochloric acid set free as dilute hydrochloric acid. In this manner considerably higher throughputs per unit of time may be obtained than was possible when operating with batch operation. Due to the relatively short reaction time during which the steam contacts the reaction mixture being hydrolyzed, products of higher purity than in intermittent operation are obtained.

In the process according to the invention, the hydrolysis products, i. e., the amino-alkyl-sulfonic acids or amino-alkane-hydrochlorides, are directly obtained in a highly concentrated form. This avoids the necessity of removing by subsequent evaporation water carried along as in the case of batch operation. Highly concentrated solutions in the sense of the invention are solutions having a sufficient water content to stoichiometrically achieve the equilibria of the above formulae. It is possible, however, to use solutions having a considerably higher water content. The limitation of the water content is only determined by economical considerations since the evaporation of unduly large quantities of water becomes too expensive from the commercial point of view.

The amino sulfonic acids obtained in accordance with the invention may, for example, be directly used for a number of further syntheses.

In the apparatus shown in the appended drawings column 1 (Fig. 1) is a vertical column which, if necessary or desired, may be packed, as, for example, with filling bodies such as glass rings or other packings or bodies generally used for distillation or absorption purposes. The hydrolysis is effected in this vertical column, and, depending upon the material to be processed, the column may be vertical as shown, or inclined, or constructed in spiral form. A spiral-form construction for the column is particularly suitable for the treatment of materials, the hydrolysis of which proceeds relatively slowly, as, for example, chloramine hydrochlorides.

A feed vessel 2 is provided above the vertical column 1. The material to be hydrolyzed, as, for example, in the form of a concentrated aqueous solution, is passed downward from this feed vessel in the form of a slow stream, or, when using apparatus of smaller dimensions, drop by drop into the column 1, where a uniform distribution on the packed material occurs. As shown, the rate of flow from the feed vessel 2 is controlled by glass needle valve. A collecting vessel 3 is positioned at the base of the column and is provided with a laterally attached immersion pipe or tube 4, into which superheated steam is passed. The collecting vessel 3 is also provided with a device for the withdrawal of a hydrolysis product formed. As shown in Fig. 1, this withdrawal is effected through the simple petcock 5. If the withdrawal of the hydrolysis product should be continuous, an overflow 6 may be provided as shown in Fig. 2, or other suitable devices may be used.

As the steam is passed through the inlet connection end of 4 into the collecting vessel 3, the same passes from below into and upward through the column, where it intimately contacts the reaction mixture flowing downwardly. The temperature in the column increases to such an extent that the hydrochloric acid forming during the hydrolysis will pass in an upward direction through the lateral pipe 7 attached to the top of the column and into a condenser 8, from which it may be passed into a storage container.

In the column 1 and collecting vessel 3 the heat losses should preferably be kept as low as possible, since the water content of the hydrolysis product formed is dependent upon the temperature in the hydrolyzing column. The heat losses may, for example, be kept at a minimum by providing the insulation 9 for the column. With the use of higher temperatures, a viscous highly concentrated hydrolysis product is obtained, which may be directly used for further syntheses.

To prevent any obstruction forming in the column, the temperature within the column and the flow velocity of the rising stream must be so adjusted that the hydrolysate at the temperature selected will flow off into the collecting vessel. This temperature is preferably maintained between 105° and 230° C. No large amounts of heat are evolved during the reaction and the process of the hydrolysis in accordance with the invention can easily be controlled.

By controlling the influx rate of the starting material and by selecting a suitable length of the hydrolyzing column, an almost quantitative yield of the reaction products may always be achieved, even in the case of difficultly saponifying products, the hydrolysis of which proceeds only slowly.

Since hydrogen chloride is always involved in the process according to the invention, the individual parts of the apparatus must be constructed of, or lined with, materials which are resistant to hydrochloric acid, as, for example, glass, ceramic masses, special steels, noble metals, and plastics.

The following examples are given by way of illustration and not limitation:

Example 1

50 grams n-butylamine were neutralized with concentrated hydrochloric acid and then treated in aqueous solution with chlorine while irradiating with ultraviolet light until the stoichiometrical quantity of 0.92 gram atom of chlorine was substituted in the aliphatic carbon chain. The hydrochloric acid formed thereby was extensively distilled off in vacuo and the residue was saponified with 500 cc. of water at 150° C. in an enamelled pressure vessel. The content of the pressure vessel was freed under vacuum from the hydrochloric acid formed and the remaining residue was then mixed with concentrated caustic soda solution. 15.2 grams 4-amino-butanol having a boiling point of 95–105° C. at 10 mm. Hg could be recovered by distillation from the reaction mixture which was a yield of 24.9% of the theoretically possible quantity.

Example 2

50 grams n-pentylamine were dissolved in 400 cc. carbon tetrachloride and neutralized with hydrogen chloride. The reaction mixture was treated with gaseous chlorine while using actinic light until a stoichiometric quantity of 0.92 gram atom chlorine was introduced into the aliphatic carbon chain. Then the solvent was distilled off and the residue was saponified with 500 cc. of water and worked up in the manner described in Example 1. 21 grams 5-amino-pentanol having a boiling point of 105–115° C. at 8 mm. Hg were obtained as the final product. This was a yield of 35.5% of the theoretically possible quantity of 5-amino-pentanol.

Example 3

50 grams n-hexylamine were dissolved in 400 cc. carbon tetrachloride and neutralized with hydrogen chloride. While irradiating with a mercury vapor lamp, chlorine was passed into the reaction mixture until a stoichiometric quantity of 1.48 gram atom of chlorine was absorbed. The solution was then freed from the solvent by distillation and the residue was heated at a reflux condenser for 16 hours with 1000 cc. of water, at 100–105° C. After evaporation in vacuo, the residue remaining from the reaction solution was neutralized with concentrated caustic soda solution. By vacuum distillation 19 grams 6-amino-hexanol having a boiling point of 112–123° C. at 12 mm. Hg could be isolated as the final product, which was a yield of 32.8% of the theoretically possible quantity.

Example 4

50 grams 5-chlor-1-amino-pentane hydrochloride were saponified with 250 cc. of water in an enamelled pressure vessel for 3 hours at 150° C. After neutralization with concentrated caustic soda solution, 25 grams 5-amino-pentanol having a boiling point of 108–110° C. at 8 mm. Hg could be recovered. This product was probably pure 5-amino-pentanol-(1). This was a yield of 77.8% of the theoretically possible quantity of 5-amino-pentanol.

Example 5

50 grams 2-amino-octane were dissolved in 300 cc. carbon tetrachloride and neutralized by introducing dry gaseous hydrogen chloride. While irradiating with actinic light, gaseous chlorine was passed into the suspension until a stoichiometric quantity of 0.6 gram atom of chlorine per mol amino octane was introduced into the aliphatic carbon chain. After having distilled off the suspending agent, the residue was saponified with 350 cc. of water and worked up in the manner described in Example 8 at 160° C. distillation, 11.5 grams 2-amino-octanol having a boiling point of 120–135° C. at 10 mm. Hg were obtained.

Example 6

50 grams 1-amino-butane-sulfochloride-(x)-hydrochloride were heated for half an hour in 50 cc. of water with reflux in a round-bottomed flask provided with reflux condenser and thereafter sharply evaporated to dryness under vacuum at 100° C. The residue was mixed with 50 cc. of absolute alcohol and, after heating for a short time, again evaporated under vacuum at 100° C.

After the addition of 100 cc. absolute alcohol and allowing to stand for several hours, 33.5 grams 1-amino-butane-sulfonic-(x) acid crystallized at room temperature. The yield was 91% of the theoretically possible quantity.

Example 7

50 grams 1-amino-pentane-sulfochloride-(x) hydrochloride were dissolved in 50 cc. of water and allowed to stand for 50 hours at 20° C. After evaporation of the solution under vacuum at 100° C., the residue was mixed with 50 cc. absolute alcohol and again sharply evaporated to dryness. The residue thereby formed was heated for a short time with 100 cc. absolute alcohol and allowed to stand at 0° C. 32.5 grams 1-amino-pentane-sulfonic-(x) acid, corresponding to 86% of the theoretically possible yield, separated from the solution.

Example 8

10 grams 1-amino-hexane-sulfochloride-(x) hydrochloride were heated with 10 cc. of water for 5 hours at 150° C. in a pressure vessel, and the solution was concentrated by evaporation under vacuum at 100° C. The reaction solution thereby formed was processed in the manner described in Example 6. This resulted in 7.05 grams 1-amino-hexane-sulfonic-(x) acid, which corresponded to 92% of the theoretically possible yield.

Example 9

50 grams 1-amino-butane-sulfochloride-(x) hydrochloride were dissolved in 30 cc. water in a glass flask and steam of 150° C. was passed through for half an hour. The remaining sirupy residue was boiled up with 50 cc. absolute alcohol and allowed to stand at room temperature. By sucking off the precipitated crystal slurry, 34.2 grams 1-amino-butane-sulfonic-(x) acid were obtained. The yield amounted to 93% of the theoretically possible quantity.

Example 10

An apparatus which chiefly consisted of a vertical, well-insulated glass column 1 of 50 cm. in length and 3 cm. in diameter, was used for the hydrolysis of chlorinated n-hexylamine hydrochloride, which contained 20.2% by weight of chlorine in its aliphatic carbon chain. The feed vessel 2, which was connected to the top of the column and which was provided with a needle valve of glass, contained a 50% by weight aqueous solution of chlorinated n-hexylamine hydrochloride, 50 grams per hour of which flowed slowly through the needle valve into the column 1, which was packed with glass rings of 3 x 3 mm. At the same time, 500 grams per hour of superheated steam (160° C.) were blown through the collecting vessel attached to the base and counter-currently to the slowly down-flowing salt solution. The hydrolysate, with strong evolution of hydrochloric acid, dropped as a concentrated aqueous solution into the collecting vessel 3. The hydrochloric acid set free was condensed as aqueous hydrochloric acid in cooler 8. In collecting vessel 3 there collected about 29 grams per hour of a concentrated saponification mixture which chiefly consisted of 6-amino-hexanol-(x) and n-hexylamine hydrochloride. The temperature within the column was so high that the saponification mixture was extensively dehydrated, and, on cooling, solidified into a pasty mass.

The analysis of the dried reaction product showed a residual chlorine content in the C atom chain of 2.1% by weight and indicated a 90% saponification. The hydrochloric acid obtained by condensation quantitatively corresponded to the hydrogen chloride set free in the reaction by hydrolysis.

Example 11

In the same apparatus 200 grams per hour of a 50% aqueous solution of 1-amino-butane-sulfochloride-(x) hydrochloride were treated with 500 grams per hour of superheated steam of 130° C. in the manner described in Example 10. Within one hour there collected in the collecting vessel 3, 82 grams of a still liquid, highly concentrated solution which contained 81% by weight 1-amino-butane-sulfonic-(x) acid corresponding to 91% of the theoretically expected yield.

Example 12

23.2 grams (0.2 mol) 2-chlor-1-amino-ethane hydrochloride were dissolved in 100 grams water. In an acid-proof pressure vessel this solution was heated for 3 hours at 150° C. Under reducing pressure the water then was evaporated. After the vacuum evaporation the remaining residue was neutralized with a water solution which contained 20 weight-percent of NaOH. The product of the neutralisation was fractionated at a pressure of 50 mm. Hg. 8.4 grams 2-amino-ethanol were recovered as final product, having a boiling point of 80–90° C. and a refraction index $n_D^{20}=1.4630$. The yield amounted to 69% of the thoretically possible quantity.

Example 13

19.4 grams (0.10 mol) of 1-amino-propane sulfochloride-(x)-hydrochloride were heated with 18 grams (1.0 mol) of water for 8 hours at 100–105° C. under a reflux condenser and subsequently evaporated to dryness under vacuum. The residue obtained was mixed with 100 cc. of alcohol and allowed to stand for 48 hours at −10° C. 10.4 grams (corresponding to 75% of the theory) of 1-amino-propane sulfonic-(x) acid melting at 290° C. crystallized from the solution.

The above examples indicate that the conversion of the hydrochlorides of alkyl amines used in accordance with the invention and containing 1 chlorine atom or 1 SO₂Cl group in their carbon chain proceeds smoothly and without cyclization in all cases. If, in contrast to this, free chloralkyl amines are treated with water at elevated temperatures, there will always take place a polymerization or cyclization. This will occur, for example, if 15.9 grams (0.2 mol) of 2-chloro-1-amino-ethane, in the presence of 80 grams of water, are heated for 3 hours at 150° C. in an enamelled pressure vessel. The reaction product thereby formed was concentrated by evaporation under a vacuum of 50 mm. Hg. The residue was mixed with 60 grams of 20% sodium hydroxide solution. In contrast to Examples 1–5, an amino-ethyl alcohol could not be isolated by distillation, nor was it possible to demonstrate the presence of amino-ethyl alcohol in the aqueous distillate by the method of S. Siggier and I. R. Kervinsky (Analytical Chemistry 23, page 117 (1951)). Instead, resinification products which were not capable of being distilled were obtained in a yield of 91% of the nitrogen contained in the starting material.

Other chlorinated alkylamines also did not yield amino alcohols.

For example, 24.3 grams (0.2 mol) of 5-chlor-1-amino-pentane were reacted with 120 grams of water and the resulting reaction product was evaporated under a vacuum of 50 mm. Hg. The residue was mixed with 60 grams of 20% sodium hydroxide solution and then distilled. The cyclic products found in the distillate comprised 5.4 grams of piperidine corresponding to 32% of the theoretically possible yield. The residue contained non-distillable resinification products in amount of 60% of that quantity which was theoretically possible according to the nitrogen content of the starting material. The formation of 5-amino-pentanol-1 could not be detected.

When reacting free chloralkyl amines with dilute hydrochloric acid at normal temperature in accordance with the method of Hansen (U. S. Patent 2,550,558), amino alcohols are not formed either.

This fact was demonstrated by dissolving 15.9 grams (0.2 mol) of 2-chlor-1-aminoethane in 200 grams of hydrochloric acid containing 36.5 grams of HCl per liter. The saponification was effected by allowing the reaction mixture to stand for 20 hours at 40° C. in a round-bottomed flask. The resulting reaction product was evaporated under a vacuum of 50 mm. Hg. The residue was mixed with 60 grams of 20% sodium hydroxide solution and then distilled. There were obtained non-distillable resinification products in a yield of 85% of that amount which was theoretically possible according to the nitrogen content. Amino ethyl alcohol could be detected neither in the residue nor in the aqueous distillate.

This result is in agreement with the statements by E. H. Rodd in "Chemistry of Carbon Compounds," page 694. Here, it is stated that halogen-substituted alkylamines undergo cyclization in the free state while they are stable when in the form of salts. However, it was not possible to those skilled in the art to learn herefrom that these hydrolrides form amino alcohols or amino-sulfonic acids when heated in the presence of water or water vapor.

In a paper by P. D. Bartlett, S. D. Ross, C. G. Swain in "Journal of the American Chemical Society," vol. 69, page 2971 (1947), it is also stated that halogen-substitued alkylamines readily undergo cyclization. From this publication, the skilled artisans were likewise unable to expect that the products according to the invention can be produced by heating hydrochlorides of alkylamides substituted by Cl or SO₂Cl in their carbon chain.

The comparative experiments described above show, that amino alcohols or amino-sulfonic acids are only formed from alkylamines containing a chlorine atom or a sulfochloride group in their carbon chain by heating at elevated temperature in the presence of water or water vapor, if the substituted alkylamines are previously converted into the corresponding hydrochlorides.

We claim:

1. Process for the conversion of compounds of the general formula $$H_2NC_nH_{2n}X$$

wherein X is a substituent selected from the group consisting of Cl and SO$_2$Cl, and $n$ is a whole number from 2 to 8, which comprises heating said compounds in form of their hydrochlorides in the presence of a member selected from the group consisting of water and water vapor.

2. Process according to claim 1, which comprises heating an amine hydrochloride selected from the group consisting of amino-alkyl-chloride-hydrochlorides and amino-alkyl-sulfochloride-hydrochlorides in the presence of a treating agent selected from the group consisting of water and water vapor to a temperature between 50 and 250° C. and recovering the hydrolysis product formed.

3. Process according to claim 1, wherein about 1 to 10 parts in weight of the treating agent are used with 1 part in weight of the substituted amino-alkyl-hydrochloride.

4. Process for the production of amino alkyl alcohols, which comprises heating a chlorinated alkylamine hydrochloride in which said alkyl group has from 2 to 8 carbon atoms in its chain in the presence of at least 1 to 10 times its quantity of water to a temperature between about 50° C. and 200° C. and thereafter recovering the corresponding amino alkyl alcohol from the reaction mixture.

5. Process for the production of an alkyl amino-sulfonic-acid which comprises heating a sulfochlorinated alkyl-amine-hydrochloride in which said alkyl group has from 2 to 8 carbon atoms in its chain in the presence of at least 1 to 10 times its quantity of water to a temperature between about 50° C. and 250° C. and thereafter recovering the corresponding amino alkyl-sulfonic acid from the reaction mixture.

6. Process according to claim 4, in which said chlorinated alkylamine hydrochloride is present in a chlorination mixture obtained by the chlorination of an alkyl amine hydrochloride in which said alkyl group contains from 2 to 8 carbon atoms in its chain.

7. Process for the continuous conversion of substituted amine-alkyl-hydrochlorides according to claim 1, which comprises intimately contacting a concentrated aqueous solution of a substituted amine-alkyl-hydrochloride selected from the group consisting of amine-alkyl-chloride-hydrochlorides and amino-alkyl-sulfochloride-hydrochlorides containing 3–6 carbon atoms with superheated steam, and recovering the hydrolysis product formed.

8. Process according to claim 7, in which said superheated steam is at a temperature of about 105–250° C.

9. Process according to claim 7, in which said superheated steam is at a temperature of about 105–170° C.

10. Process according to claim 7, in which said contacting is effected by passing the concentrated aqueous solution of the substituted amine hydrochloride down through a vertical packed reaction zone by passing superheated steam upward in counter-current flow contact therewith.

11. Process according to claim 10, which includes continuously removing the hydrochloric acid formed at the top portion of said vertical reaction zone.

12. Process according to claim 11, in which the hydrolysis product formed is substantially continuously withdrawn from the bottom of said vertical reaction zone.

13. Process according to claim 7, in which said amine hydrochloride is a chloralkyl-amine hydrochloride and in which said recovered hydrolysis product is an amino-alkanol hydrochloride.

14. Process according to claim 7, in which said amine hydrochloride in an amino-alkyl-sulfochloride-hydrochloride, and in which said recovered hydrolysis product is an amino-alkyl-sulfonic acid.

References Cited in the file of this patent

UNITED STATES PATENTS

| | | |
|---|---|---|
| 2,319,121 | Fox | May 11, 1943 |
| 2,550,558 | Hansen | Apr. 24, 1951 |
| 2,783,198 | Feichtinger et al. | Feb. 26, 1957 |

OTHER REFERENCES

Gilman Organic Chemistry, vol. I, p. 898, 2nd edition, 1943.